(12) United States Patent
Badura et al.

(10) Patent No.: US 7,324,632 B2
(45) Date of Patent: Jan. 29, 2008

(54) DISTRIBUTION DEVICE IN A DATA SIGNAL PROCESSING INSTALLATION, AND DATA SIGNAL PROCESSING INSTALLATION

(75) Inventors: Stefan Badura, Menden (DE); Mike Breuer, Hagen (DE); Ralf Czingon, Saarwellingen (DE); Rainer Zimmer, Schalksmuhle (DE)

(73) Assignee: CCS Technology Inc., Wilmington, DE (US)

( * ) Notice: Subject to any disclaimer, the term of this patent is extended or adjusted under 35 U.S.C. 154(b) by 624 days.

(21) Appl. No.: 10/311,197

(22) PCT Filed: Jun. 15, 2001

(86) PCT No.: PCT/DE01/02227

§ 371 (c)(1),
(2), (4) Date: Jul. 28, 2003

(87) PCT Pub. No.: WO01/97532

PCT Pub. Date: Dec. 20, 2001

(65) Prior Publication Data

US 2004/0022013 A1 Feb. 5, 2004

(30) Foreign Application Priority Data

Jun. 16, 2000 (DE) .............................. 100 29 870

(51) Int. Cl.
*H04M 1/64* (2006.01)
(52) U.S. Cl. ............................. 379/88.07; 379/93.08; 379/325; 379/399.02
(58) Field of Classification Search ............ 379/93.08, 379/93.09, 88.07, 325, 399.02; 714/18
See application file for complete search history.

(56) References Cited

U.S. PATENT DOCUMENTS

| 4,328,524 A | 5/1982 | Nozick ................... 361/119 |
| 4,470,127 A * | 9/1984 | Thompson ................ 714/8 |
| 4,763,226 A | 8/1988 | Pelletier ................ 361/426 |

(Continued)

FOREIGN PATENT DOCUMENTS

DE        2048104        4/1972

(Continued)

OTHER PUBLICATIONS

Smith, David; XDSL: The Solution for Today's Bandwidth Demands?; New Telecom Quarterly, 2Q97, pp. 33-37.

(Continued)

*Primary Examiner*—Gerald Gauthier
(74) *Attorney, Agent, or Firm*—Keith A. Roberson

(57) ABSTRACT

The invention relates to a distribution device (2) in a data signal processing installation (1), and a data signal processing installation (1). The distribution device comprises a distribution block (3) which has a receiving device containing elements to which data signal lines (4, 5, 6) can be connected, the functional elements having a circuit to distribute signals transmitted by the data signal lines (4, 5, 6). The distribution device also comprises a data signal editing unit with active and/or passive electronic components, in which the data signals transmitted from the data signal lines (3, 4, 5) are edited in a pre-determined manner. The data signal editing unit is integrated into the components of the distribution block (3).

18 Claims, 14 Drawing Sheets

U.S. PATENT DOCUMENTS

| | | | |
|---|---|---|---|
| 4,766,521 A | 8/1988 | Pelletier | 361/426 |
| 4,975,072 A | 12/1990 | Afshar | 439/131 |
| 4,995,728 A | 2/1991 | Finzel | 350/96.21 |
| 5,509,066 A | 4/1996 | Saligny | 379/327 |
| 5,668,857 A | 9/1997 | McHale | 379/93.07 |
| 5,930,340 A * | 7/1999 | Bell | 379/93.08 |
| 6,137,866 A | 10/2000 | Staber et al. | 379/93.06 |
| 6,314,102 B1 | 11/2001 | Czerwiec et al. | 370/395 |
| 6,438,226 B1 | 8/2002 | Guenther et al. | 379/413.04 |
| 2003/0156389 A1 | 8/2003 | Busse et al. | 361/736 |
| 2004/0022013 A1 | 2/2004 | Badura et al. | 361/679 |

FOREIGN PATENT DOCUMENTS

| | | |
|---|---|---|
| DE | 69318331 T2 | 3/1993 |
| DE | 4306349 C1 | 3/1994 |
| DE | 10029649 A1 | 6/2000 |
| DE | 10029870 A1 | 3/2002 |
| EP | 0179750 A2 | 10/1985 |
| EP | 0364658 A2 | 4/1989 |
| EP | 0559559 A1 | 3/1993 |
| EP | 0649204 B1 | 3/1997 |
| EP | 0891067 | 1/1999 |
| EP | 0909102 A2 | 4/1999 |
| EP | 0909102 A3 | 11/1999 |
| EP | 0891067 A3 | 4/2000 |
| EP | 1290762 A1 | 5/2001 |
| EP | 0909102 B1 | 5/2004 |
| EP | 1290901 B1 | 5/2004 |
| EP | 1416741 A2 | 5/2004 |
| EP | 1422948 A2 | 5/2004 |
| WO | WO99/51019 | 10/1999 |
| WO | WO01/97339 A1 | 12/2001 |

OTHER PUBLICATIONS

Technical Report TR-013, Interfaces and System Configurations for ADSL: Central Office, Jan. 1999.

Orth, B. and Pollakowski, M., "ADSL—zukunftsträchtige Übertragungstechnologie", Unterrichtsbätter Jg. 52, May 1999.

Niels Kluβmann, Encyclopedia of Communications and Information Technology, Telecommunications, Internet, Mobile Telephone System, Multimedia, Computer E-Business, 3., newly revised and greatly enlarged edition, Hüthig Verlag Heidelberg, © 2001 Hüthig GmbH & Go., KG Heidelberg (German Document & English translation attached).

* cited by examiner

DISTRIBUTION DEVICE IN A DATA SIGNAL PROCESSING INSTALLATION, AND DATA SIGNAL PROCESSING INSTALLATION

The invention relates to a distribution device, in particular a main distribution panel, of a data signal processing system, to a data signal processing system and to a cassette element for a distribution device of a data processing system.

BACKGROUND OF THE INVENTION

Distribution devices are used, for example, in telecommunications systems, especially when a relatively large number of subscribers are intended to be connected to an associated switching device. In addition to transferring speech data from telephones, computer data is also being increasingly transferred via such telecommunications systems.

In order to make it possible to use already existing copper cable network structures for this purpose, common transmission lines are used both for the low-frequency speech signals and for the high-frequency computer signals. In order to make it possible in this case to transfer computer data and speech data at the same time via a common line, the associated signals must be joined together both at the customer end and in a switching center, and must be separated from one another once again after the transmission path. This is done, for example, by using so-called splitter devices, which separate the speech and computer signals from one another on the basis of their different signal frequencies, and which are associated with the respective purpose. This means that data signals are preprocessed by deliberately splitting the frequency ranges of the data to be transmitted to respective speech subscribers and to the devices provided for processing of the data.

Such data preprocessing devices have until now been provided in the form of additive components, which are added as external components to existing data signal processing systems. This has resulted in problems in that data preprocessing devices such as these involve long connecting routes and a large number of electronic contact elements for producing the necessary connections for the data signal processing system. In consequence, the associated overall system becomes more expensive and more susceptible to defects overall, with the latter being the case especially with long transmission paths. In this case, signal power losses which are caused by long conductor paths and a large number of contact points must be overcome by means of complex, and once again expensive, amplification and suppression measures.

FIG. 1 shows a conventional schematic layout of such a data processing system 100 with a distribution device 110 according to the prior art. According to this figure, the distribution device 110 has two separate distribution blocks 120, 130, of which the distribution block 120 is connected, in order to transmit exclusively speech data signals, to a switching system 140 (for example a distribution block) of a telephone switching system 150 and to a splitter device 160, which is itself connected to a modem device 170 for transmitting exclusively computer data signals, and this modem device 170 is connected to a computer network 180. The second distribution block 130 of the distribution device 110 is connected to the switching system 190 (for example a distribution block) of a subscriber 200 and to the splitter device 160 in order to transmit both computer and speech data signals. In this telecommunications system, computer and speech data signals originating from the subscriber 200 are transmitted on a common line 210 to the second distribution block 130, from where they are passed on via a distribution line 220 to the splitter device 160.

The splitter device 160 separates the speech and computer data signals, with the computer data signals being passed to the modem device 170 and the speech data signals being passed to the first distribution block 120, from which it is then supplied to the telephone switching system 150. In the opposite situation, the speech data signals which arrive from the telephone switching system 150 via the first distribution block 120 as well as the computer data signals which arrive from the computer data network via the modem 170 are joined together by the splitter device 160 and are passed to the subscriber 200 via the second distribution block 130. In this telecommunications system 100, connecting lines 220, 230 with associated connections are required both between the first distribution block 120 and the splitter device 160 as well as between the second distribution block 130 and the splitter device 160.

SUMMARY OF THE INVENTIONS

One object of the invention is to provide a device for a data signal processing system as well as a data signal processing system, in which speech data and computer data signals can be transmitted via common lines, and which nevertheless allows good and disturbance-resistant data transmission even over long transmission paths. Another object of the invention is to provide a means using which an existing data signal processing system can be retrofitted easily to form a system according to the invention.

According to the invention, a distribution device, in particular a main distribution panel, of a data signal processing system is provided, having a distribution block which has functional elements, to which data signal lines can be connected and which have circuitry for distribution of the data signals which are transmitted by the data signal lines to the distribution device. The distribution block furthermore has an accommodating apparatus, in which the functional elements are accommodated. The distribution device has a data signal preprocessing unit with active and/or passive electronic components, which process data signals transmitted by the data signal lines are preprocessed in a predetermined manner. This data signal preprocessing unit is integrated in the components of the distribution block.

In this context, the expression passive electronic components means components such as resistors, capacitors, coils, and the like while, in contrast, the expression active electronic components means all types of semiconductor elements, such as transistors.

The data signal preprocessing unit allows the data signals, which may be both analog and digital speech data and computer data signals, to be preprocessed in a desired manner, for example being split, allocated or organized on a destination-oriented basis, and combined once again to form a combined speech data/computer data overall signal in order in this way to pass on a large number of speech and computer data signals, which are transmitted from subscribers via the signal lines at the same time, as appropriate for their destination.

The integration of this data signal preprocessing unit in the distribution device in this case allows a major simplification to be achieved in the design of an associated telecommunications system. The data signals which originate from telephone switching systems and networks can thus be passed directly to the distribution device without in the mean time passing through any further distribution or preprocessing systems, since the preprocessing of the data signals is carried out by the data signal preprocessing unit which is integrated in the distribution device. Furthermore, the integral configuration of the distribution device with the data signal preprocessing unit avoids long transmission lines between distribution blocks and the data signal preprocessing unit; in particular, the distribution device has a reduced number of lines and associated connections, since lines can be connected directly to the distribution block at the distribution device not only from the subscribers but also from the network and from a telephone switching system without any need for circuitous paths to other distribution blocks and preprocessing systems. This results in a system which is simpler overall, and hence also considerably more cost-effective, and which can be installed more quickly. The space required for the system is also reduced by the reduction in conductors and the shortening of the conductor runs.

The shorter conductor runs and the reduced number of additional electrical contact points for additional electrical connections furthermore also increases the performance of the system and reduces its susceptibility to disturbances and defects.

Thus, from a physical point of view, the distribution device itself represents a component with a sufficiently large amount of accommodation and capabilities for enlargement without any problems for this purpose, in order to accommodate additional components, so that it is possible to fit the electronic components of the data signal preprocessing unit to the hardware parts, that is to say physical components, of the distribution panel in a simple manner and hence cost-effectively.

By virtue of the integral configuration of the distribution block with the data signal preprocessing unit and the short interconnection and conductor paths which are achieved in this way, together with the reduced number of electrical contact points, the distribution device thus represents a powerful system, which nevertheless has little susceptibility to disturbances and defects, for the use in a data signal processing system.

The distribution device according to the invention furthermore results in reliable isolation between the respective subscribers, since the splitting and hence breaking down of their data signals is carried out in an access-proof manner within the distribution device, which is not accessible to third parties.

The distribution device according to the invention can be provided for the connection of copper conductors, which are attached to associated cable terminals, preferably insulation-displacement terminals, which are themselves arranged in one or more rows on the respective functional element, forming one or more terminal strips. As an alternative to this, the functional elements may also be designed to accommodate coaxial cables and optical fiber cables. According to one embodiment, the distribution device is in the form of a hybrid distribution panel, which has functional elements for accommodating all three types of conductor mentioned, that is to say copper, coaxial and optical fiber cables.

According to one preferred embodiment of the invention, the data signal preprocessing unit has a filter arrangement comprising high-pass and/or low-pass and/or bandpass filters, by means of which the data signals which are transmitted by the data signal lines can be filtered out and passed on as a function of their frequency ranges.

This means that the filter arrangement filters out the data signals which are transmitted at the same time on one data signal conductor, such as speech data and computer data signals, depending on their specific frequency ranges, and passes them to associated distribution lines which, for example, lead to a modem device with a downstream computer network or to a telephone switching system. This allows a data transfer of different data signals between the distribution device and subscribers connected thereto via a common data signal line which is allocated to the respective subscriber. The different data signals are in this case allocated different data signal frequencies, which are detected by the filter arrangement in order to filter out the associated data signals and in order to make it possible to pass them on appropriately to the respective subscriber, and specifically depending on the type of data signal (speech data signal or computer data signals).

Although the electronic components of the data signal preprocessing unit may be fitted, for example, within the accommodating apparatus using separate holders, they are preferably arranged directly on one or more of the functional elements and/or on the accommodating apparatus. This is achieved, for example, by attaching the components directly to wall elements of the accommodating apparatus, for example by riveting or screwing them, or by soldering them to board elements of the functional elements. This results in a more space-saving and cost-effective structure, in that the components of the distribution block which are available in any case are utilized directly for fitting of the additional components. This thus represents a maximum level of integration.

As an alternative to this, the distribution block may also have one or more cassette elements or plug elements, which are assembled detachably with associated functional elements in order to transmit data signals between them, and in which the data signal preprocessing unit or a part of it is arranged. In this case, it is possible to retrofit the distribution block with up-to-date data signal preprocessing units simply by replacing the cassette elements or plug elements, without any need to replace the distribution panel overall or to carry out complex and hence expensive work, such as soldering. The respective cassette element and the associated functional element are preferably fitted to one another via a simple plug connection, which at the same time acts as the interface between the cassette element and the functional element.

When cassette elements or plug elements are used as the location for accommodation of the components of the data signal preprocessing unit in the distribution block, it is particularly preferable for the respective cassette element or plug element to be designed such that it can be connected to the functional element as a replacement for an overvoltage/overcurrent protection magazine or an overvoltage/overcurrent protection plug, and using its interface. Such protection magazines and protection plugs are provided in various embodiments of main distribution panels and distribution strips according to the prior art. Their replacement by the cassette elements and plug elements according to the invention thus represent a particularly simple and space-saving embodiment, in which few additional physical changes need be carried out to the distribution panel structure. Certain existing distribution panels can thus also be retrofitted with the cassette element or plug element according to the invention.

According to one embodiment of the invention, the accommodating apparatus is in the form of an accommodating trough into which the functional elements can be inserted, wherein the electronic components of the data signal preprocessing unit or some of the components are fitted to the bottom of the accommodating trough, and wherein at least one plug connector part is fitted to the bottom of the accommodating trough and is connected to those electronic components of the data signal preprocessing unit which are fitted to the bottom of the accommodating trough, and in which an associated functional element can engage, producing an electrical contact between the functional element and those components of the data signal preprocessing unit which are fitted to the bottom of the accommodating trough.

With its shape closed on three sides, the accommodating trough forms a secure housing to which, furthermore, the plug-in functional elements can be fitted in a simple and variable manner from its open side. The large bottom area of the trough in this case represents a highly protected and nevertheless easily accessible location for accommodating electronic components, since the bottom surface is protected at the rear by the associated bottom wall of the accommodating trough, and is protected at the front by the plug-on functional elements; furthermore, it can be exposed quickly simply by unplugging the functional elements. The plug connector installed on the bottom of the trough likewise provides a secure electrical functional connection, in a simple manner, between the data signal preprocessing unit and the functional elements.

Although the electronic components may be fitted, for example, directly to the bottom of the trough, they are preferably arranged on a board which is fitted to the bottom of the accommodating trough. This board is also referred to as a backplane and has the advantage that the associated data signal preprocessing unit can be fitted as one part to the accommodating trough and can be replaced from the trough, so that the associated distribution device can be assembled and maintained more easily.

Alternatively or additionally, the electronic components of the data signal preprocessing unit, or some of the components, are arranged on one or more mounting boards, which are detachably assembled with the respectively associated functional element. The mounting board is in this case, for example, fitted directly to the rear face of the functional element, lengthening it, and is electrically connected to the functional element.

Furthermore, alternatively or additionally, the electronic components of the data signal preprocessing unit, or some of the components, are arranged on one or more intermediate boards, which are each arranged between two functional elements and which are provided with a contact-making device. The electronic components on the intermediate board are connected via the latter to the circuitry of the distribution device.

When the functional elements are used to hold the component or components of the data signal preprocessing unit, the functional elements advantageously have printed circuit boards which are intended for accommodating the electronic components of the data signal preprocessing unit and to which connections are fitted for connection of the data signal lines. The printed circuit boards represent components with small dimensions and high reliability with regard to the transmission of electrical signals. They may furthermore also be provided as direct mounts for connecting parts for the signal lines to be connected, thus saving further space and achieving a simpler and thus more cost-effective design. When using copper cables or braided cables of this type as signal lines, insulation-displacement terminals are preferably provided as the connecting parts. When using coaxial and/or optical fiber cables, associated plugs may be fitted, for example screwed, to the printed circuit boards.

Furthermore, a data signal processing system with the distribution device according to the invention is provided according to the invention. This data/data signal processing system represents a powerful and disturbance-free system on the basis of the advantages of the distribution device as described above, by means of which speech data and computer data signals can also be transmitted quickly and reliably even over long transmission paths.

Furthermore, a cassette element is provided according to the invention, which has a data signal processing unit comprising active and/or passive electronic components, by which data signals which are supplied to a distribution device of a data signal processing system are preprocessed in a predetermined manner. The cassette element according to the invention is designed such that it can be fitted to the functional element, in order to transmit data signals in both directions, via an interface which is arranged on an associated functional element of the distribution device. The cassette elements according to the invention can be replaced in a simple manner by cassette elements which have been updated with regard to the data signal preprocessing unit in each case arranged on them.

The cassette element is preferably designed such that it can be connected to an associated functional element of the distribution device, in order to transmit data signals between them, as a replacement for an overvoltage/overcurrent protection magazine and using its interface. This cassette element according to the invention allows existing distribution devices, for example certain main distribution panels in telecommunications systems, to be retrofitted with a data signal preprocessing unit, so that existing communications systems can be converted to simpler and more robust systems.

BRIEF DESCRIPTION OF THE DRAWING FIGURES

DETAILED DESCRIPTION OF THE INVENTIONS

Figure 2:
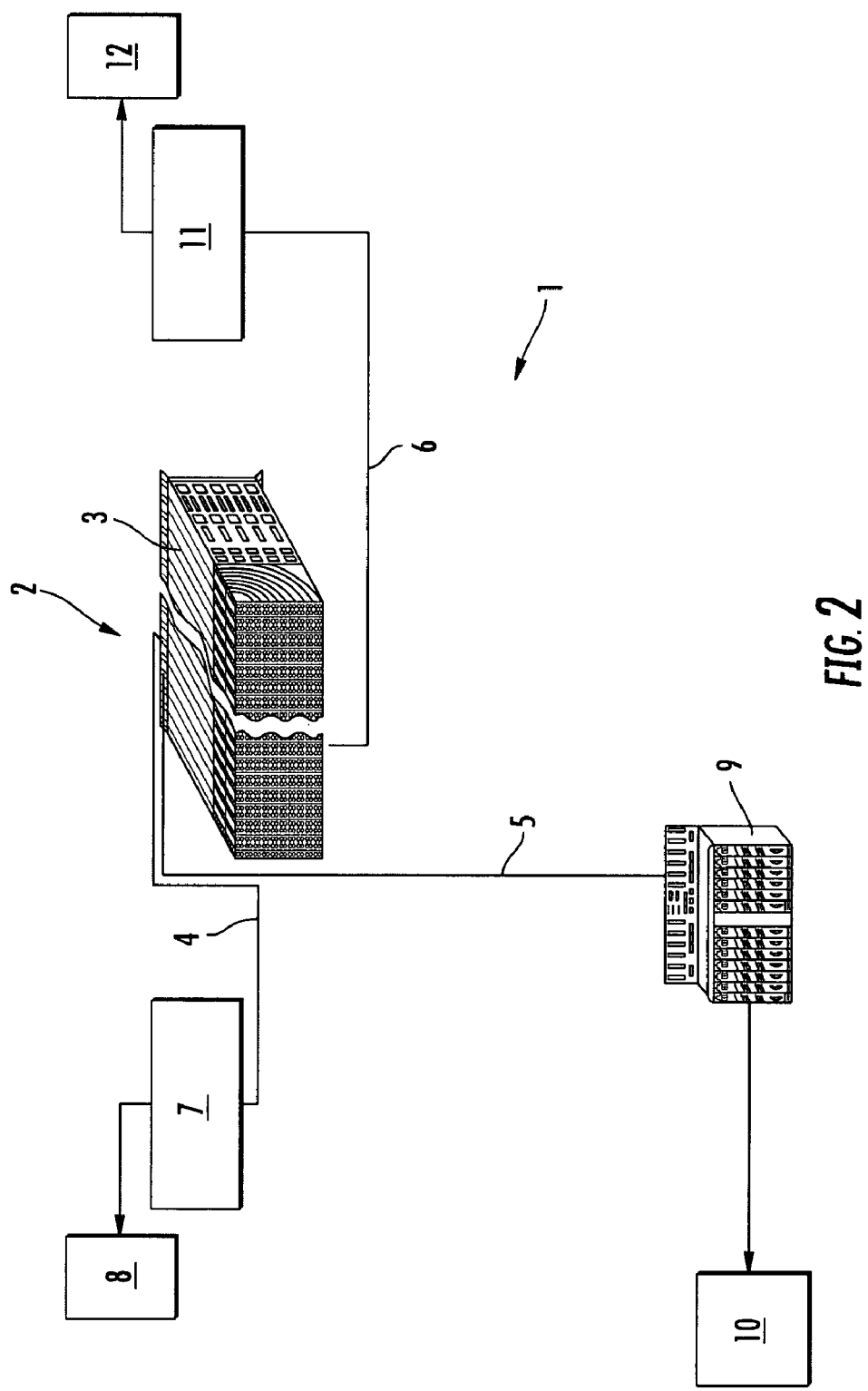
FIG. 2 shows a data signal preprocessing system in the form of a telecommunications system according to one embodiment of the invention.

The telecommunications system 1 according to the invention as shown in FIG. 2 has a distribution device 2 with a single distribution block 3, to which a switching system 7 (for example a distribution block) of a telephone switching system 8, a modem device 9 of a computer network 10 and a switching system 11 (for example a distribution block) of a subscriber 12 are connected via conductors 4, 5 and 6. In the case where such a large number of subscribers 6 are connected to the distribution block that a single distribution block 3 is not sufficient, it is also possible to provide a number of coupled distribution blocks. Only low-frequency speech data signals are transmitted via the conductor 4 between the distribution block 3 and the telephone switching system while, in contrast, only computer data signals, in particular at high frequencies, are transmitted via the line 5 between the computer network 10—with the interposition of the modem device 9—and the distribution block 3 of the distribution device 2. Speech data signals and computer data signals are transmitted at the same time via the conductor 6 between the subscriber 12 and the distribution block 3.

A data signal preprocessing unit (which is not illustrated) is integrated in the distribution block 3 and combines the speech data signals and the computer data signals which are supplied to the distribution block 3 via the conductors 4 and 5, respectively, to form a combined speech data/computer data signal, which is then supplied via the conductor 6 to the subscriber 12. In the opposite direction, a combined speech data/computer data signal which is supplied from the subscriber 12 via the conductor 6 to the distribution block 3 is split by the data signal preprocessing unit, which is integrated in the distribution block, into separate speech data signals and computer data signals, which are passed via the respectively associated conductors 4 and 5 to the respective telephone switching system 8 or to the computer network 10.

Accordingly, in contrast to the system according to the prior art as described above, the telecommunications system 1 according to the invention has two fewer transmission lines with associated connecting parts and a separate distribution block, which is connected between the modem and the telephone switching system.

Figure 1:
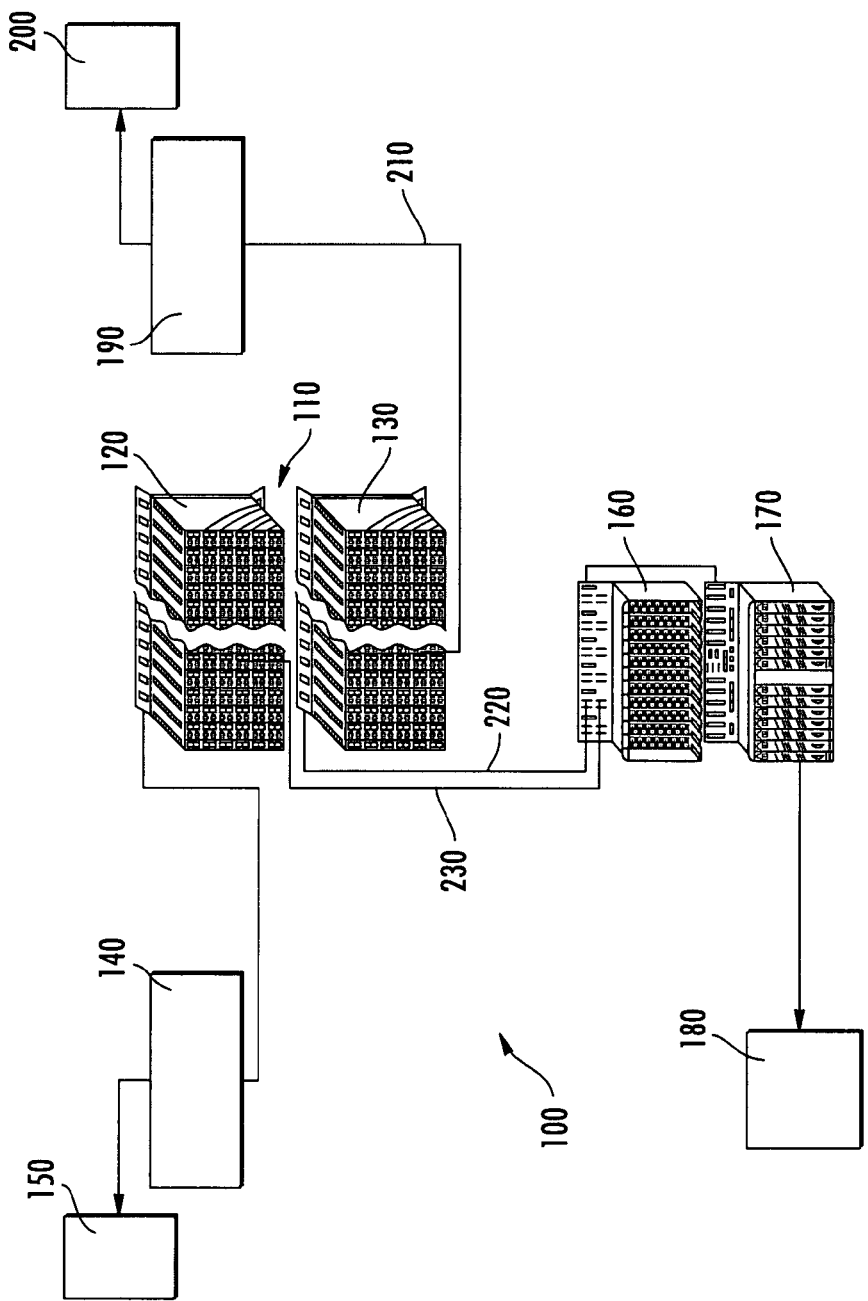
FIG. 1 shows a telecommunications system according to the prior art.
Figure 3:
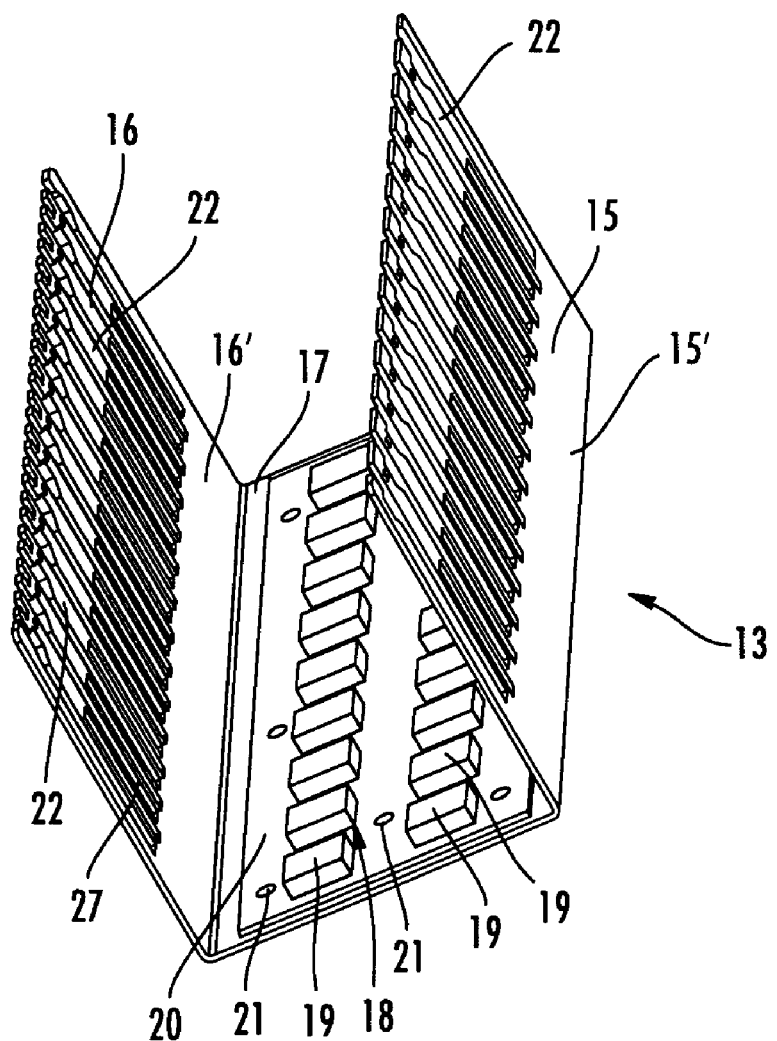
FIGS. 3 and 4 show perspective views of an accommodating trough in a distribution block of a distribution device according to one embodiment of the invention.
Figure 4:
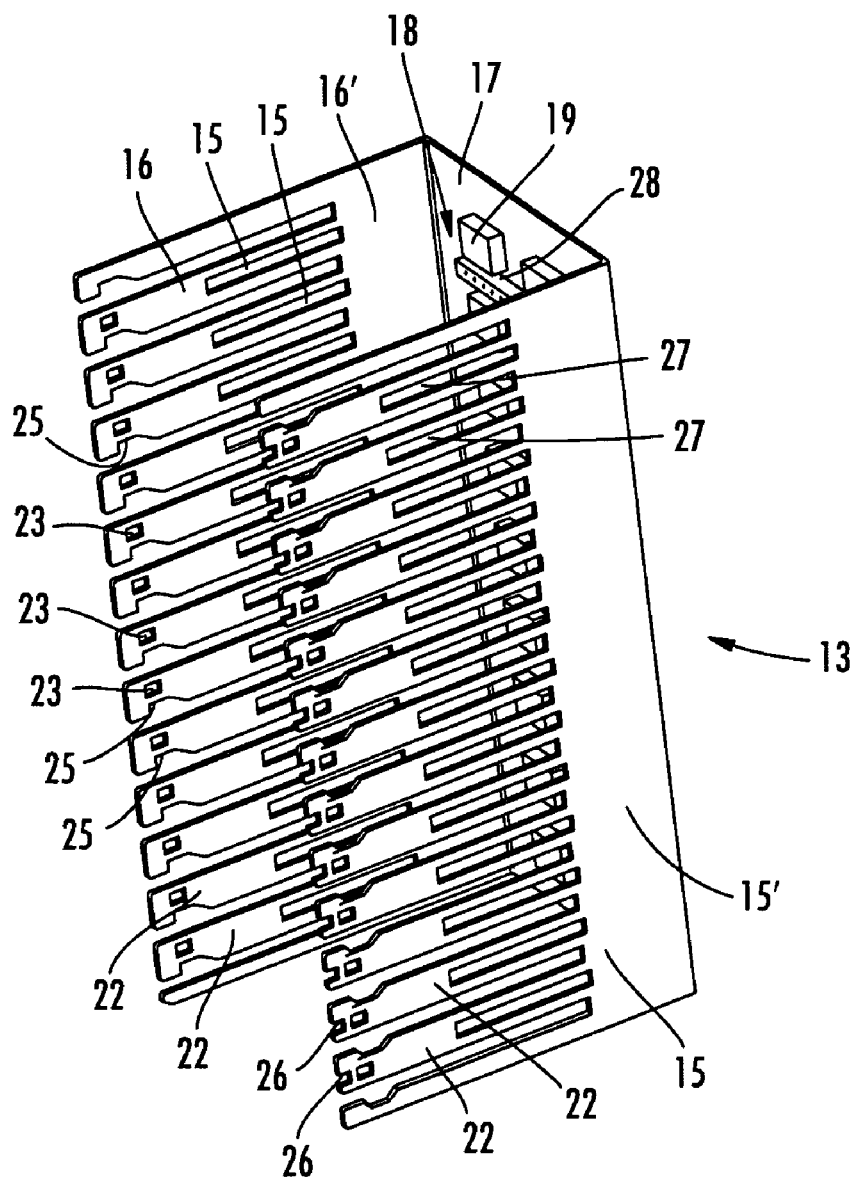

FIGS. 3 and 4 show an elongated accommodating trough 13 in a distribution block 3 of a data signal processing system according to one embodiment of the invention, in two different perspective views; the distribution block 3 is in this case provided as a main distribution panel. Functional elements 14, such as those illustrated for instance in an example in FIG. 5 (introduced and discussed below) are inserted into the accommodating trough 13, which can be seen in FIGS. 1 and 2, located one above the other and with their longitudinal direction transversely with respect to the longitudinal direction of the accommodating trough 13, thus forming the distribution block 3, by means of which the data signals are distributed in a predetermined manner from the conductors 4, 5 and 6 connected to the distribution block 3.

The accommodating trough 13 has a continuously U-shaped cross section and thus has two mutually parallel side walls as trough limbs 15, 16, and has a trough bottom 17 which runs at right angles to these trough walls 15, 16 and via which the trough limbs 15, 16 are connected to one another. The accommodating trough 13 is preferably manufactured from a sheet-metal material, which is easily flexible and which, furthermore, is easy to process by stamping. However, the way in which the recesses that are formed in the trough are produced is not restricted to stamping; other types of production may also be used, such as laser processing. A data signal preprocessing unit 18 in the form of an arrangement of active and passive electronic components 19, that is to say resistors, coils and the like as well as semiconductor elements in the form of transistors, is fitted on the inner face of the accommodating trough. This data signal preprocessing unit 18 detects the data signals distributed by means of the distribution panel as well as the data associated with them, splits them and passes them on in a destination-oriented manner, that is to say on the basis of the intended data destination and the type of data signal (speech data signal or computer data signal). The data signal preprocessing unit 18 is thus in the form of a so-called splitter filter arrangement, which filters data signals out of a data/data signal bundle on a frequency-oriented basis, and passes these data signals to the associated transmission destinations. These transmission destinations in the case of one preferred arrangement of the main distribution panel according to the invention in a telecommunications system are the subscribers as well as a telephone switching system and a computer network, which allows the subscribers to be switched in the desired manner between speech data and computer data. In the other direction, however, the data signal preprocessing unit 18 also combines speech data signals, which originate from the telephone switching system, and computer data signals, which originate from the computer network, to form combined speech data/computer data signals, which are then transmitted via a common conductor to the subscribers.

The data signal preprocessing unit 18 has a board 20 with holes 21 via which the board 20 is attached to the trough bottom 17 of the accommodating trough 13, for example by means of riveting or screwing. The components 19 of the data signal preprocessing unit 18 are themselves fitted vertically on the board 20, by means of soldering or plug-in contacts, such that they are connected to the conductor tracks, which are not illustrated.

The trough limbs 15, 16 each have a row of holding tongues 22 which are formed, for example by stamping, from the trough limbs 15, 16 and which can also be used as connecting tongues for interconnection conductors within the distribution panel. A narrow limb section 15', 16' of the respective trough limb 15, 16 is provided between the fixed end of the holding tongues 22 and the trough bottom 17 as a side wall section of the accommodating trough 13 without any recesses, and which limb section 15', 16' forms the foot for the associated holding tongues 22. On its free end section, each holding tongue 22 has a recess 23 in the form of a hole, in which a hook 24 on an associated functional element 14 (see FIG. 5) can engage in a latching manner, in order to fix the functional element 14 on the accommodating trough 13. On its free end section, each holding tongue 22 furthermore has a cutout 25, which is adjacent to the recess 23 and is intended for accommodating a wire guide (which is not illustrated), for interconnection wires. The cutout 25 is in the form of a hook for this purpose, so that the wire guide, which is not illustrated, can engage in the cutout 25 in order to mount it on the holding tongue 22 with a corresponding mating piece. The cutouts 23 in the holding tongues 22 of the right-hand and left-hand trough limbs 15, 16 in FIGS. 3 and 4 are provided such that they are open at the side in mutually opposite directions, seen in the longitudinal direction of the accommodating trough 13. The holding tongues 22 of the right-hand trough limb 15 in FIGS. 3, 4 are furthermore provided on their free end sections with an end-face cutout 26 while, in contrast, the free end sections of the holding tongues 22 of the left-hand trough limb 16 in FIGS. 3, 4 do not have any such cutout. The end-face cutouts 26 are used to hold guide tabs (which are not illustrated) on the functional elements 14, so that the latter can be inserted into the accommodating trough 13 only in the correct orientation during assembly of the distribution block.

On their other end section, that is to say on their foot section, the holding tongues 22 are furthermore provided with a recess 27 which is elongated in the tongue longitudinal direction. These recesses 27 are used to hold cable plugs (not illustrated), which are routed to the accommodating trough 13 at the sides and are themselves inserted into corresponding accommodating bushes on the functional elements 14 in order to transmit data signals. Conductors for the circuitry of the functional elements 14 and/or circuitry via printed circuit boards are provided on these cable plugs.

As can be seen from FIG. 4, the data signal preprocessing unit 18 also has a plug connector part 28 in the form of a plug socket, in which an associated plug connector part (which is not illustrated but is in the form of a plug) of one of the functional elements 14 can engage, in order in this way to produce an electrical contact between the functional element 14 and its internal circuitry as well as any connection it may have to other functional elements, in a simple manner, by insertion of this functional element 14 into the accommodating trough 13.

Figure 5:
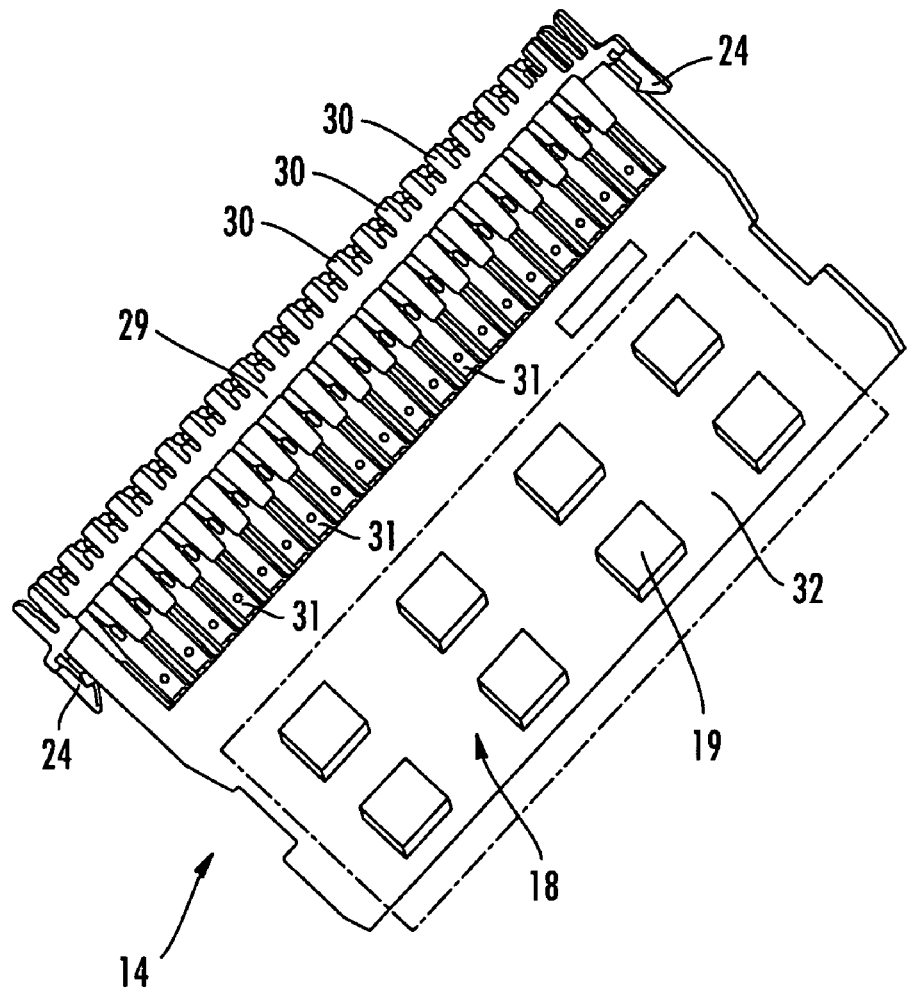
FIG. 5 shows a perspective view of a functional element of a distribution block of a distribution device according to the invention.

The functional element 14 shown in FIG. 5 is intended to accommodate copper cables or other braided cables with a terminal strip 29 having a number of insulation-displacement terminals 30, into which the copper cables (not shown) to be connected are inserted. The insulation-displacement terminals 30 are arranged successively in a longitudinal row, with one of the hooks 24 described above being located at each end of the terminal strip 29. The insulation-displacement terminals 30 are continued downward by means of contact springs 31, via which a plug-in contact is achieved with a distribution circuit, which is not shown. The functional element 14 furthermore has a second terminal strip, which is not illustrated but is designed to correspond to the terminal strip 29 described above, and is arranged parallel to it. The signal flow generally runs only separately in the respective functional elements 14, to be precise between the conductors which are connected to the two cable strips associated with the functional element 14. However, interconnections between conductors are also feasible, which are connected to different functional elements 14. Furthermore, one functional element may also have more than two cable strips. The interconnections are designed in the form of cable guides which are integrated in the main distribution panel; alternatively, printed circuit boards with appropriate conductors tracks can also be provided as the interconnections.

The terminal strip 29 and the terminal strip which is not shown are fitted on a printed circuit board 32 on which components 19 of a data signal preprocessing unit 18 are fitted. The printed circuit board may also be provided with such components on both sides, thus saving space. The arrangement of the data signal preprocessing unit 18 on the functional element 14 has the advantage that it can be specifically matched to the associated circuitry plan of the functional element 14, and can thus be arranged at any desired point in any desired accommodating trough 13 without any need for additional trimming between the preprocessing unit 18 and the functional element 14.

Figure 6:
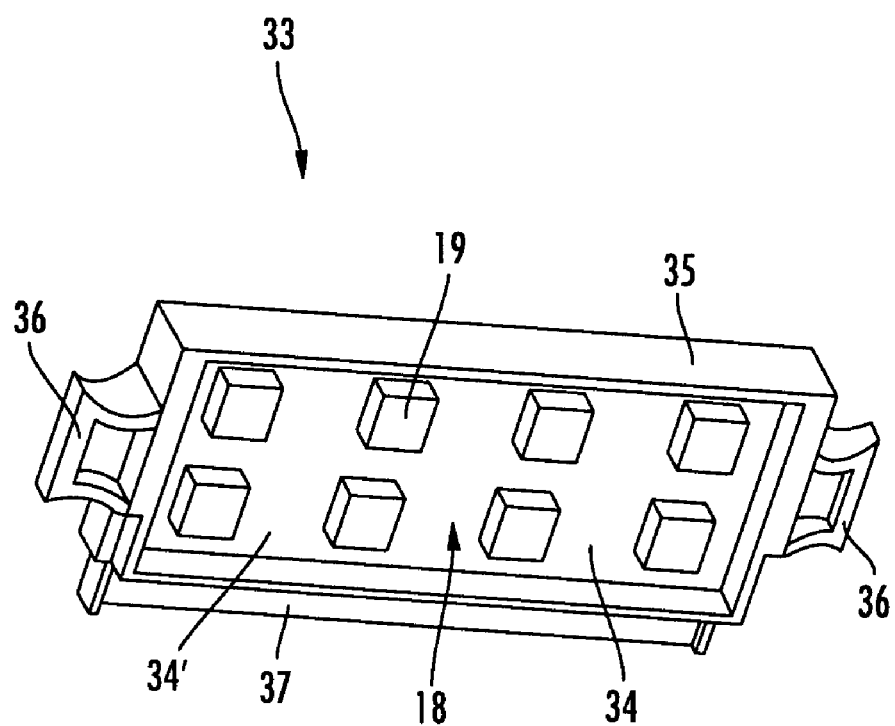
FIGS. 6 and 7 show perspective views of a cassette element according to the invention for a distribution device according to one embodiment of the invention.
Figure 7:
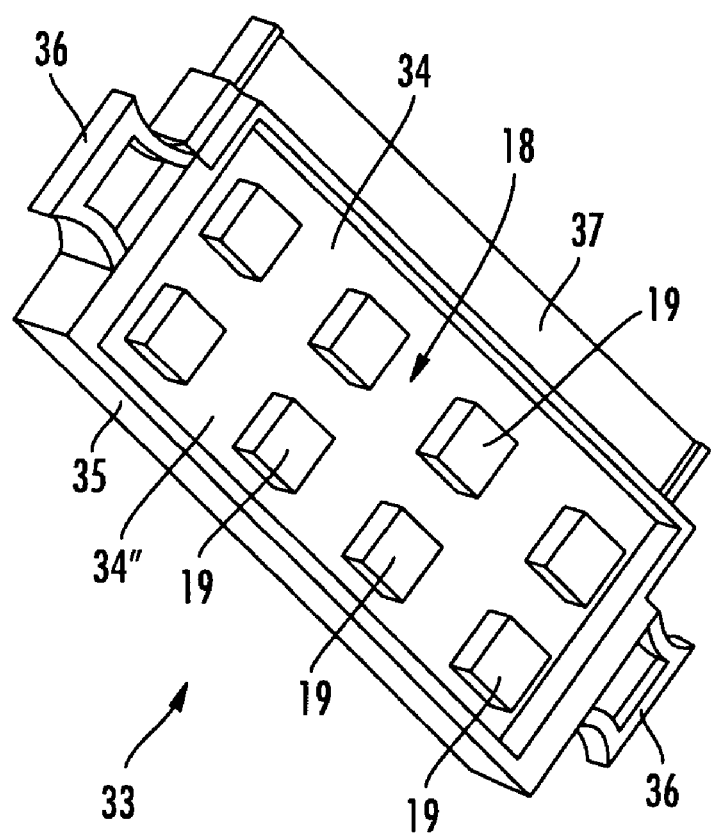

FIGS. 6 and 7 show a cassette element 33, according to the invention, of a distribution device of a data signal processing system according to one embodiment of the invention, in two different perspective views.

The cassette element 33 has a printed circuit board 34 on both sides of which, that is to say on its front face 34' and its rear face 34", components 19 of a data signal preprocessing unit 18, as described above, are in each case fitted. The printed circuit board 34 is held by a frame 35 on which two handles 36 are fitted, which are arranged on mutually opposite frame sections. The cassette element 33 is rectangular in form, with the handles 36 being arranged on the shorter rectangular sides of the frame 35. A contact spring strip 37 is provided on one longitudinal side of the cassette element 33, is electrically connected to those components 19 of the data signal preprocessing system 18 which are arranged on the printed circuit board 32, and can be inserted into an accommodating bush (not illustrated), which is associated with it, on an associated functional element 14, in order to produce an electrical connection between the data signal preprocessing unit 18 on the cassette side and the circuitry and/or the data signal preprocessing unit 18 on the functional element 14 and/or the data signal preprocessing unit in the accommodating trough 13, in which the functional element 14 is accommodated.

It is particularly preferable for the contact spring strip 37 of the cassette element 33 to be designed to be compatible with such a connecting socket on the functional element side, which is otherwise intended for accommodating overvoltage/overcurrent protection magazines. Thus, in a situation where the specified protection regulations allow, the protection magazine of a distribution device, for example of a main distribution panel for a telecommunications system, can be replaced by the cassette element according to the invention with the data signal preprocessing unit 18 forming a distribution device according to the invention, so that the associated data signal processing signal can be upgraded to a system which is faster but nevertheless operates reliably.

Figure 8:
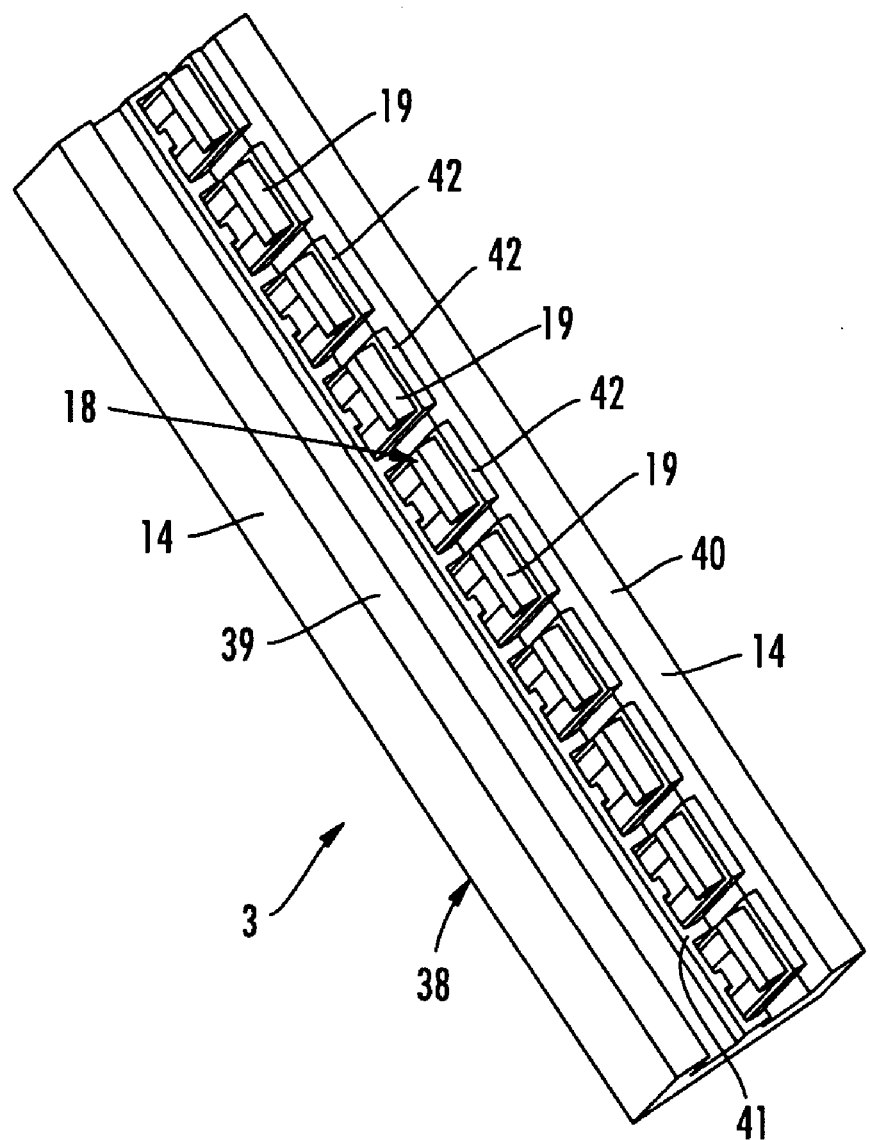
FIG. 8 shows a perspective view of a distribution strip according to one embodiment of the invention.

FIG. 8 shows the distribution block 3 in the form of an elongated distribution strip 38, according to one embodiment of the invention. The distribution strip 38 has an E-profile cross section, with the two outer strip limbs 39, 40 of the distribution strip 38 forming the functional elements 14 to which signal lines, which are not shown, are connected. For this purpose, the strip limbs 39, 40 have cable terminals on their rear face, to which the signal lines can be fitted.

A central limb 41 of the E-profile distribution strip 38 is provided on its front face with recesses for accommodating individual plugs 42, on which, for their part, components 19 of a data signal preprocessing unit 18 are fitted. The individual plugs 42 are accommodated in the recesses, as replacements for overcurrent/overvoltage protection plugs. In a situation where the distribution strip is not provided with such protection plugs, the components 19 of the data signal preprocessing unit 18 may also be fitted by other types of attachment to the distribution strip, for example by screwing them to the central limb 41.

Figure 9:
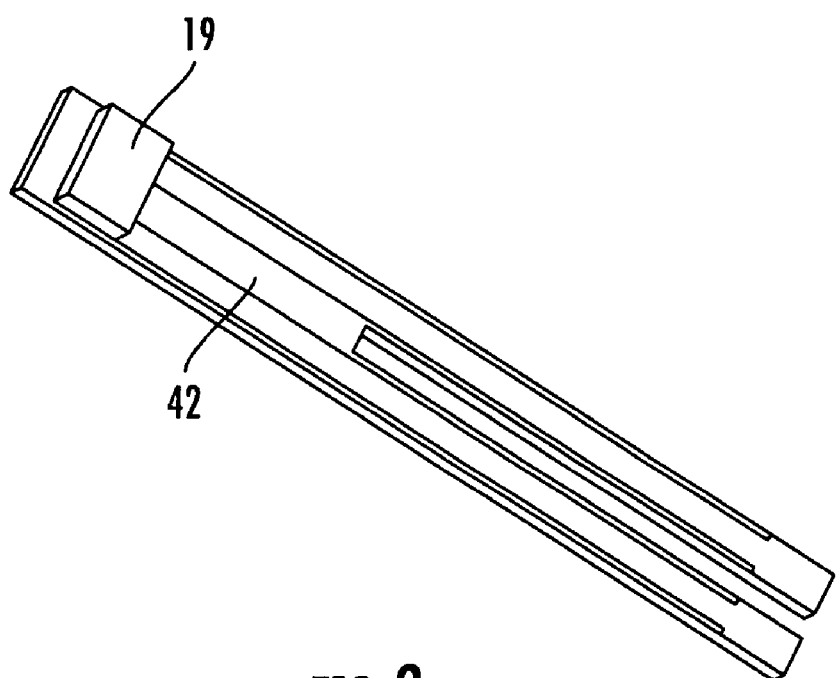
FIG. 9 shows a perspective view of an individual plug for a distribution strip according to one embodiment of the invention.

FIG. 9 shows an individual plug 42 according to the invention with a component 19 of a data signal preprocessing unit.

Figure 10:
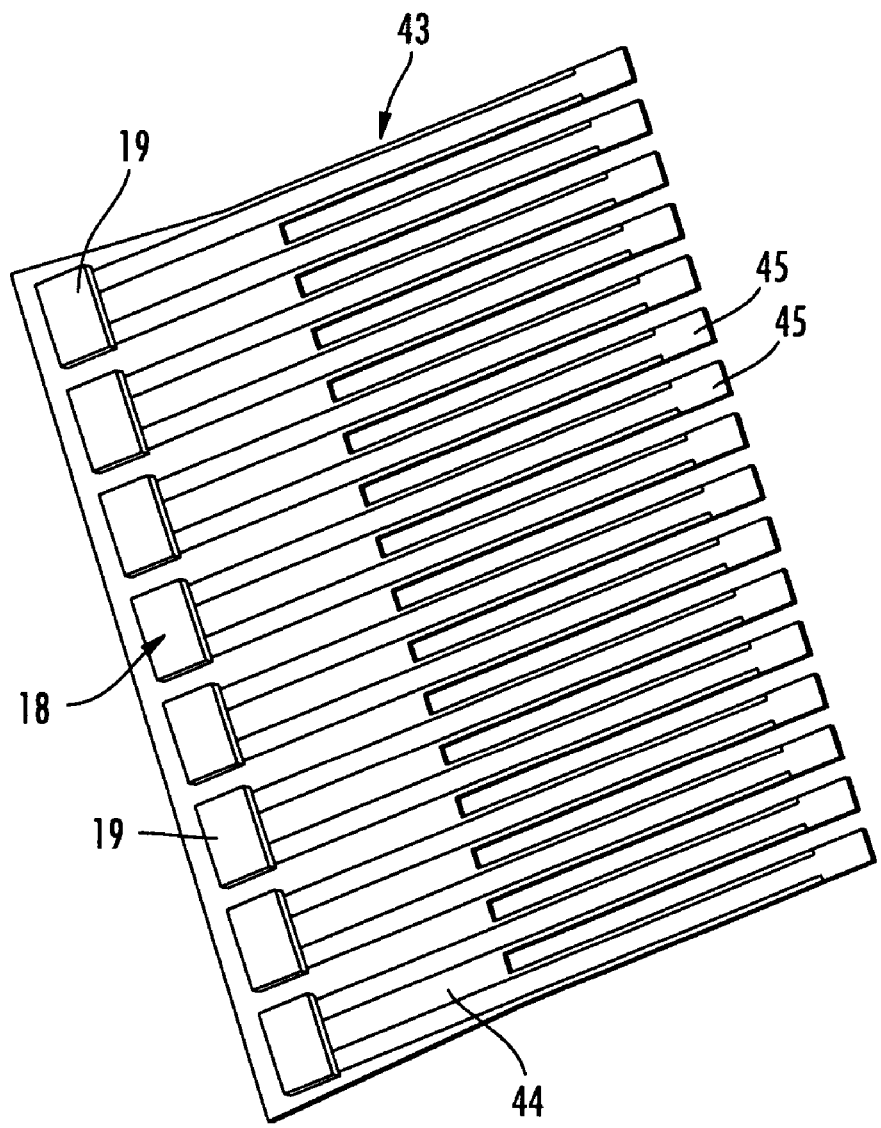
FIG. 10 shows a perspective view of a plug board of a distribution strip according to one embodiment of the invention.

FIG. 10 shows an alternative to the individual plugs 42; according to this alternative, a plug-in cassette 43 is provided which has a board 44 from which connecting tongues 45 are formed which can make electrical contact with the distribution strip 38 by inserting the connecting tongues of the plug-in cassette 43 into the recesses in the distribution strip 38. Furthermore, components 19 of a data signal preprocessing unit 18 are fitted on the board 44.

Figure 11:
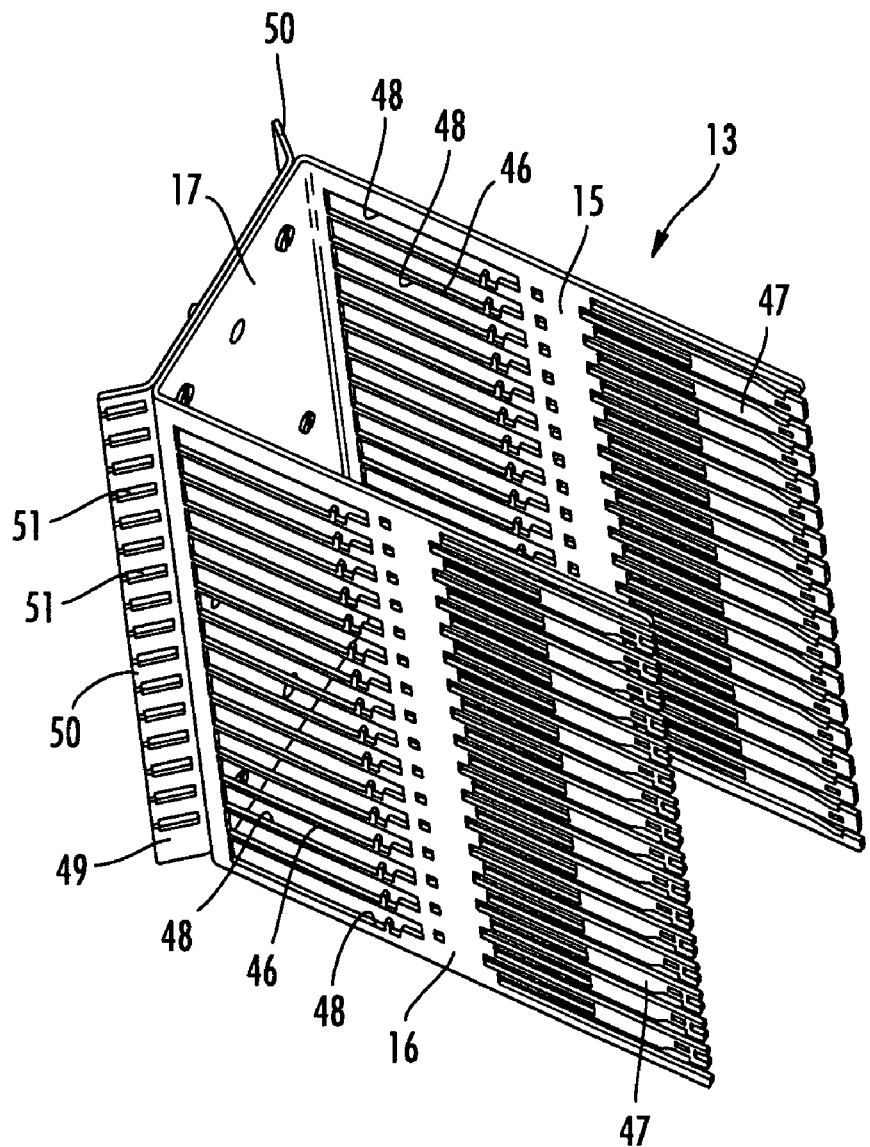
FIG. 11 shows a perspective view of an accommodating trough in a distribution block of a distribution device according to one embodiment of the invention.

FIG. 11 shows another accommodating trough 13 of a main distribution panel according to one embodiment of the invention. This accommodating trough 13 differs from the accommodating trough 13 shown in FIGS. 3 and 4 in that it has longer trough limbs 15, 16, which each have two limb areas 46, 47, to be precise a limb area 46 which is adjacent to the trough bottom 17 and a limb area 47 which faces away from the trough bottom. The latter are designed such that they are essentially identical to the trough limbs 15, 16 of the accommodating trough described in FIGS. 3, 4, so that they will not be described here.

Those limb areas 46 of the trough limbs 15, 16 which face the trough bottom 17 each have elongated recesses 48, whose longitudinal directions extend in that direction in which the respective trough limb 15, 16 extends away from the trough bottom 17. The recesses 48 are used for accommodating cassette elements 33, which can be inserted into the recesses 48 from the side of the accommodating trough 13 and can then be inserted into the functional elements 14, which are arranged in the front area between the limb areas 47, thus producing an electrical connection.

A holder 49 is screwed to the rear face of the trough bottom 17 and has strips 50, which extend parallel to the side edge of the trough bottom 17 and outward from it, with slots 51 formed in them to accommodate data signal lines, which are not shown.

Figure 12:
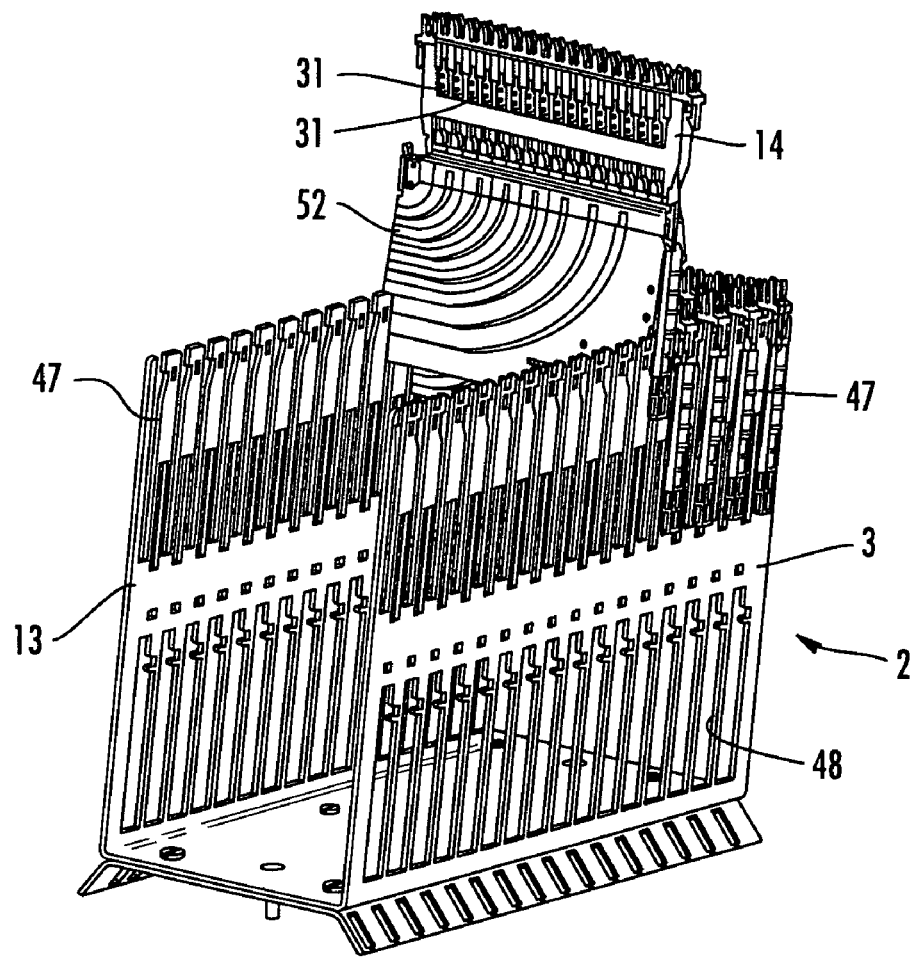
FIGS. 12 and 13 show perspective views of a main distribution panel according to one embodiment of the invention, which views demonstrate the assembly of the main distribution panel.
Figure 13:
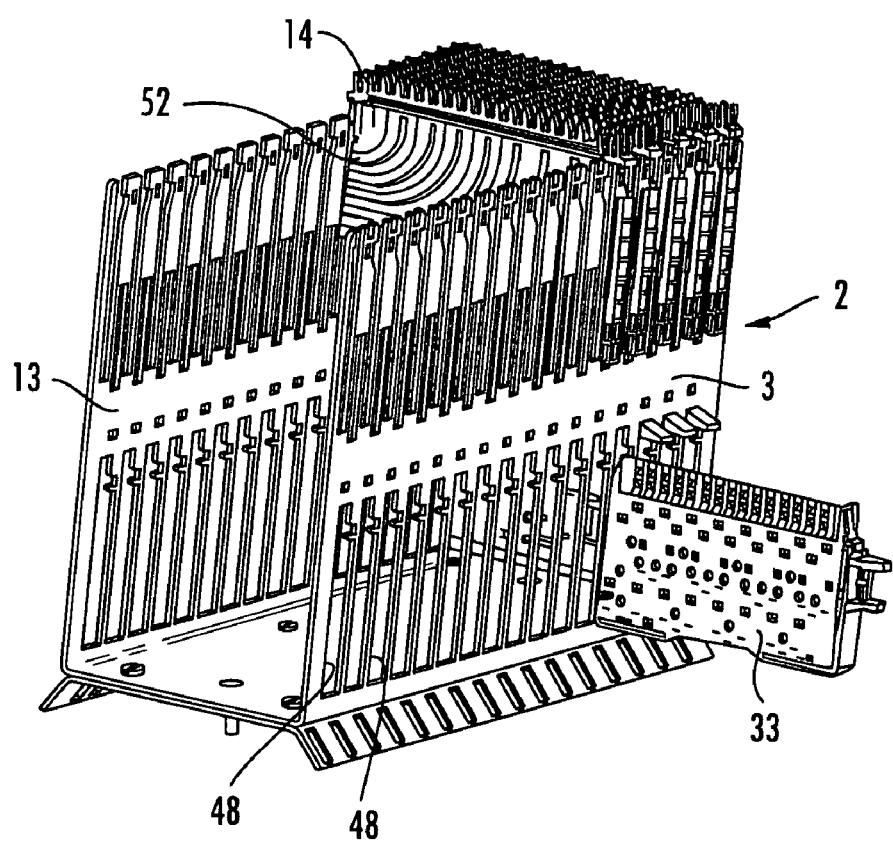

FIGS. 12 and 13 show assembly procedures during the assembly of a main distribution panel according to the invention as a distribution block 3 of a distribution device 2. The main distribution panel has an accommodating trough 13 of the type described with reference to FIG. 11, so that reference shall be made to the explanatory notes above with regard to the design of the accommodating trough 13.

Functional elements 14 with cable guides 52 connected to them are arranged in the front area between the limb areas 47 of the accommodating trough 13, with the functional elements 14 being accommodated in the cable guides 52, and making electrical contact with them via their contact springs 31.

FIG. 13 shows how a cassette element 33 can be inserted into the associated recess 48 from the side of the accommodating trough 13. The cassette elements 33 can then be plugged together from the rear face of the functional elements 14, forming an electrical contact with the functional elements 14.

In this embodiment of the invention, the electronic components of the data signal preprocessing unit are arranged inside the respective cassette element 33. This means that, in this case, each functional element 14 has a data signal preprocessing unit which is especially associated with it.

Figure 14:
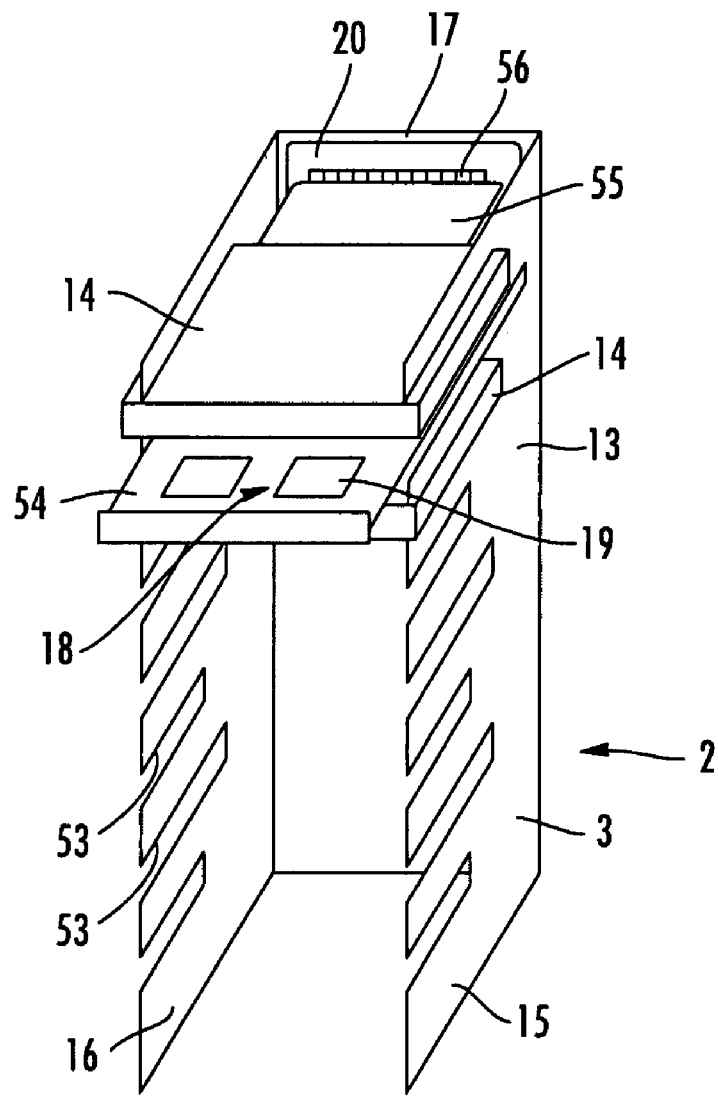
FIG. 14 shows a perspective view of a main distribution panel according to another embodiment of the invention.

FIG. 14 shows, schematically, a distribution device 2 with a distribution block 3 in the form of a main distribution panel according to one embodiment of the invention. The distribution block 3 has an accommodating trough 13 with a U-profile, in whose trough limbs 15, 16 slots 53 are formed in order to accommodate functional elements 14 and intermediate boards 54 (only one of which is shown) arranged between them. A data signal preprocessing unit 18 which is associated with the respective functional element 14 and has electronic components 19 is arranged on the respective intermediate board 54. associated with the respective functional element 14 and has electronic components 19 is arranged on the respective intermediate board 54.

A printed circuit board 55 is arranged behind the respective functional element 14 between said functional element 14 and the bottom 17 of the accommodating trough 13, and is plugged into the associated functional element 14 such that they are electrically connected. The printed circuit board 55 may also be in the form of a mounting board for accommodating electronic components of the or a data signal preprocessing unit; it is electrically connected to a printed circuit board 20 (backplane) via a plug strip 56, with the printed circuit board 20 being fitted on the inside of the trough bottom 17. In this case, conductor tracks are provided on the printed circuit board 55 and on the printed circuit board 20, forming an interconnection for the respectively associated functional element 14.

The invention claimed is:

1. A distribution device of a data signal processing system for selectively combining and splitting data signals made up of speech data signals and computer data signals, the distribution device comprising:
   a distribution block having an accommodating apparatus configured to hold a plurality of functional elements in a stacked manner and that has connected thereto first, second and third signal-carrying conductors;
   at least one functional element operably held in the accommodating apparatus and having circuitry that distributes the speech data signals and the computer data signals transmitted by the first, second and third signal-carrying conductors to the distribution block; and
   a data signal preprocessing unit arranged in the accommodating apparatus so as to be electrically connected to the at least one functional element, the data signal processing unit being adapted to receive the speech data signals and computer data signals and split or combine them in a predetermined manner so as to distribute them in a destination-oriented manner to the first, second and/or third signal-carrying conductors via the at least one functional element.

2. A distribution device according to claim 1, wherein the speech data signals and the computer data signals have different frequencies, and wherein the data signal preprocessing unit includes electronic components configured to form a filter arrangement comprising at least one of a high-pass filter, a low-pass filter, and a bandpass filter, and that operates to split or combine the speech data signals and the computer data signals as a function of signal frequency.

3. A distribution device according to claim 1, wherein the electronic components of the data signal preprocessing unit are arranged directly on one or more of the at least one functional element and the accommodating apparatus.

4. A distribution device according to claim 1, wherein the distribution block comprises at least one of a cassette element and a plug element that is assembled detachably with associated functional elements in order to transmit data signals between them, and wherein at least a part the data signal preprocessing unit is arranged.

5. A distribution device according to claim 4, wherein the cassette element is adapted to be connected to the functional element as a replacement for an overvoltage/overcurrent protection magazine in an interface for the overvoltage/overcurrent protection magazine.

6. A distribution device according to claim 1, wherein the accommodating apparatus is in the form of an accommodating trough that includes a bottom, and wherein:
   at least a portion of the data signal preprocessing unit is fitted to the bottom of the accommodating trough; and
   wherein at least one plug connector part is fitted to the bottom of the accommodating trough and is connected to said portion of the data signal preprocessing unit and in which an associated functional element can engage, producing an electrical contact between the functional element and said portion of the data signal preprocessing unit.

7. A distribution device according to claim 6, wherein the data signal processing unit includes electronic components, and wherein at least some of the electronic components are fitted to the bottom of the accommodating trough.

8. A distribution device according to claim 1, wherein the data signal preprocessing unit includes one or more electronic components arranged on one or more mounting boards that are detachably assembled with the respectively associated functional element.

9. A distribution device according to claim 1, wherein the device includes a plurality of functional elements, and wherein the data signal processing unit includes one or more electronic components arranged on one or more intermediate boards that are arranged between the functional elements and that are provided with a contact-making device.

10. A distribution device according to claim 1 wherein the at least one functional element has a printed circuit board adapted to accommodate one or more the electronic components of the data signal preprocessing unit, and that includes electrical connections for connecting to the data signal lines.

11. A data signal processing system comprising:
a distribution device according to claim 1;
a first switching system adapted to switch speech data signals and connected to the distribution device via the first signal-carrying conductor;
a second switching system adapted to switch computer data signals and speech data signals and connected to the distribution device via the second signal-carrying conductor; and
a modem adapted to process computer data signals and connected to the distribution device via the third signal-carrying conductor.

12. A distribution device according to claim 1, wherein the speech data signals are analog signals and the computer data signals are analog signals.

13. A distribution device according to claim 1, wherein the speech data signals are digital signals and the computer data signals are digital signals.

14. The distribution device according to claim 1, wherein the data signal processing unit is arranged on the at least one functional element.

15. A cassette element for a distribution block of a data signal processing system that has a functional element, wherein the data signal processing system is adapted to selectively combine and split data signals made up of speech data signals and computer data signals provided to the distribution block via first, second and/or third signal-carrying conductors, the cassette element comprising:
a printed circuit board having a side, and an electrical contact member on said side to facilitate the modulator insertion of the cassette into the distribution block;
a data signal preprocessing unit composed of at least one of an active electronic component and a passive electronic component and electrically connected to the electrical contact member, the data signal processing unit being adapted to receive the speech data signals and computer data signals and split or combine them in a predetermined manner so as to distribute them in a destination-oriented manner to the first, second and/or third signal-carrying conductors; and
wherein the cassette element is adapted to be fitted to the functional element at a first functional element interface in order to transmit data signals between the cassette element and the functional element.

16. A cassette element according to claim 15, wherein the functional element interface is adapted for selective connection to an overvoltage/overcurrent protection magazine and wherein the cassette element is adapted to be selectively connected to the interface.

17. A cassette element according to claim 15, wherein the speech data signals are analog signals and the computer data signals are analog signals.

18. A cassette element according to claim 15, wherein the speech data signals are digital signals and the computer data signals are digital signals.

* * * * *